US011878658B2

(12) United States Patent
Polster et al.

(10) Patent No.: US 11,878,658 B2
(45) Date of Patent: Jan. 23, 2024

(54) CARRIER DEVICE FOR SECURING AN ACCESSORY TO A VEHICLE

(71) Applicant: ALLEN GLOBAL FZCO, Dubai (AE)

(72) Inventors: Hannah Polster, Marblehead, MA (US); Marcus Hanna, Beverly, MA (US); Tyler Kelsall, Cambrige, MA (US); John Fiegener, Marblehead, MA (US); Alexander Allen, Lisbon (PT)

(73) Assignee: Allen Global FZCO, Dubai (AE)

( * ) Notice: Subject to any disclaimer, the term of this patent is extended or adjusted under 35 U.S.C. 154(b) by 335 days.

(21) Appl. No.: 17/466,018

(22) Filed: Sep. 3, 2021

(65) Prior Publication Data

US 2023/0071906 A1 Mar. 9, 2023

(51) Int. Cl.
*B60R 9/058* (2006.01)
*B60R 9/045* (2006.01)
(Continued)

(52) U.S. Cl.
CPC .............. *B60R 9/058* (2013.01); *B60R 9/045* (2013.01); *B60R 9/048* (2013.01); *F16B 47/00* (2013.01); *B60R 9/10* (2013.01)

(58) Field of Classification Search
CPC ......... B60R 9/058; B60R 9/045; B60R 9/048; B60R 9/10; F16B 47/00
See application file for complete search history.

(56) References Cited

U.S. PATENT DOCUMENTS 4,403,716 A 9/1983 Carlson et al.
5,169,042 A 12/1992 Ching
(Continued)

FOREIGN PATENT DOCUMENTS

DE 102016012882 6/2017
KR 20150019101 A 2/2015
(Continued)

OTHER PUBLICATIONS

Utility U.S. Appl. No. 17/248,970, filed Feb. 16, 2021; titled "Carrier Device for Securing an Accessory to a Vehicle".

*Primary Examiner* — Derek J Battisti
(74) *Attorney, Agent, or Firm* — Pierce Atwood LLP

(57) ABSTRACT

A carrier device for securing an accessory to a vehicle is provided. The carrier device includes a support frame and a first suction cup. The first suction cup includes a suction cup housing defining a suction chamber, a vacuum pump configured to selectively adjust the pressure within the suction chamber to couple the first suction cup to a vehicle, and a first pressure sensor positioned within the suction cup housing to detect suction chamber pressure information. The first suction cup may further includes an electrical line coupled to the first pressure sensor to transmit suction chamber pressure information to a location outside of the first suction cup, and an integrally molded housing formed around the electrical line to prevent pressure loss within the suction chamber. The first suction cup may include a short range wireless module positioned within the suction cup housing and coupled to the first pressure sensor to selectively pair the first pressure sensor to a nearby electronic device to transmit the suction chamber pressure information to a location outside of the first suction cup.

11 Claims, 18 Drawing Sheets

(51) Int. Cl.
    *F16B 47/00*     (2006.01)
    *B60R 9/048*     (2006.01)
    *B60R 9/10*     (2006.01)

(56) References Cited

U.S. PATENT DOCUMENTS

| | | |
|---|---|---|
| 5,184,858 A | 2/1993 | Arai |
| 6,523,731 B1 | 2/2003 | Pedrini |
| 7,673,914 B2 | 3/2010 | Liao |
| 8,814,113 B1 * | 8/2014 | Chen .................... F16B 47/00 |
| | | 248/205.5 |
| 9,821,721 B2 | 11/2017 | Casagrande |
| 10,030,690 B2 | 7/2018 | Liu |
| 10,267,453 B2 | 4/2019 | Casagrande |
| 11,648,883 B1 * | 5/2023 | Buttermore ............ B60R 9/058 |
| | | 224/309 |
| 2007/0164065 A1 | 7/2007 | Davis |
| 2014/0326237 A1 * | 11/2014 | Seiver .................. A61M 16/0816 |
| | | 128/202.22 |
| 2018/0072235 A1 | 3/2018 | Casagrande |
| 2018/0251076 A1 | 9/2018 | Casagrande |
| 2019/0063488 A1 | 2/2019 | Becker |
| 2019/0162363 A1 * | 5/2019 | Koch .................... F16B 47/006 |
| 2019/0242521 A1 | 8/2019 | Casagrande |
| 2020/0269768 A1 | 8/2020 | Jarrard |

FOREIGN PATENT DOCUMENTS

| | | | | |
|---|---|---|---|---|
| KR | 20190031898 | * | 3/2019 | ............ B60R 9/10 |
| KR | 20190031898 A | | 10/2019 | |
| WO | 2017156581 A1 | | 9/2017 | |
| WO | WO2018093417 | * | 5/2018 | ............ B60R 13/00 |

\* cited by examiner

Figure 8A
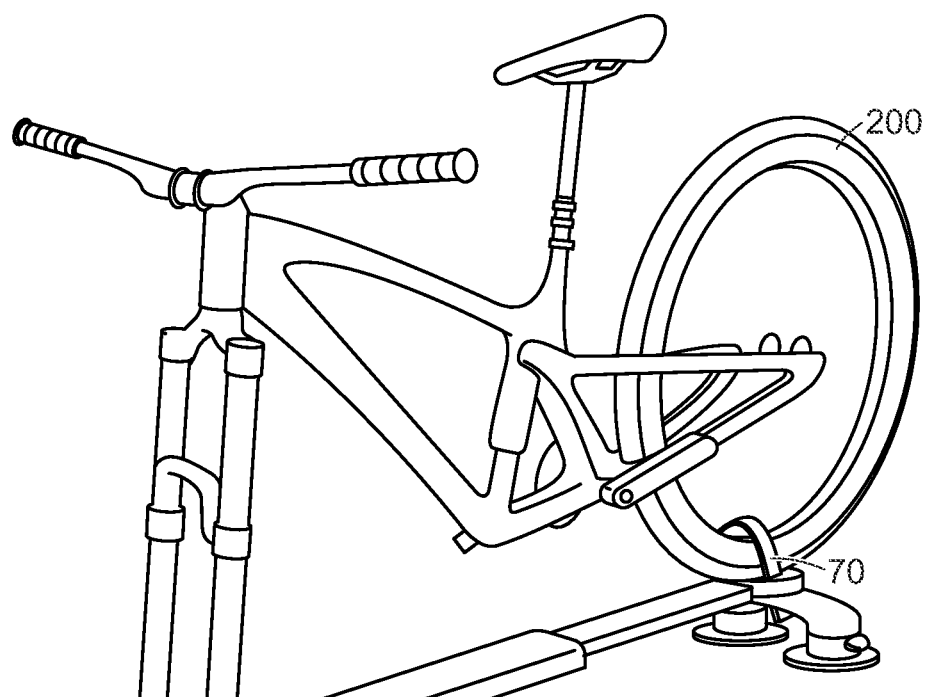
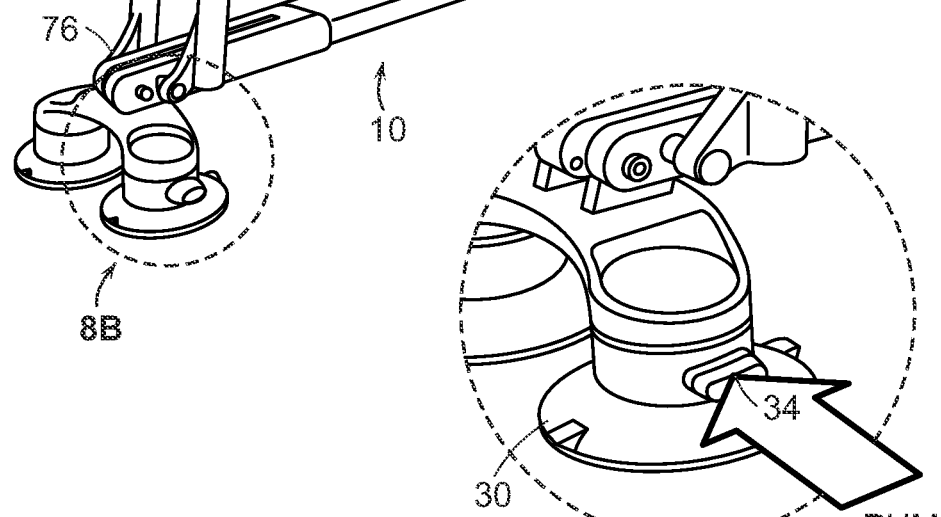
PUMP TO SECURE RACK
Figure 8B

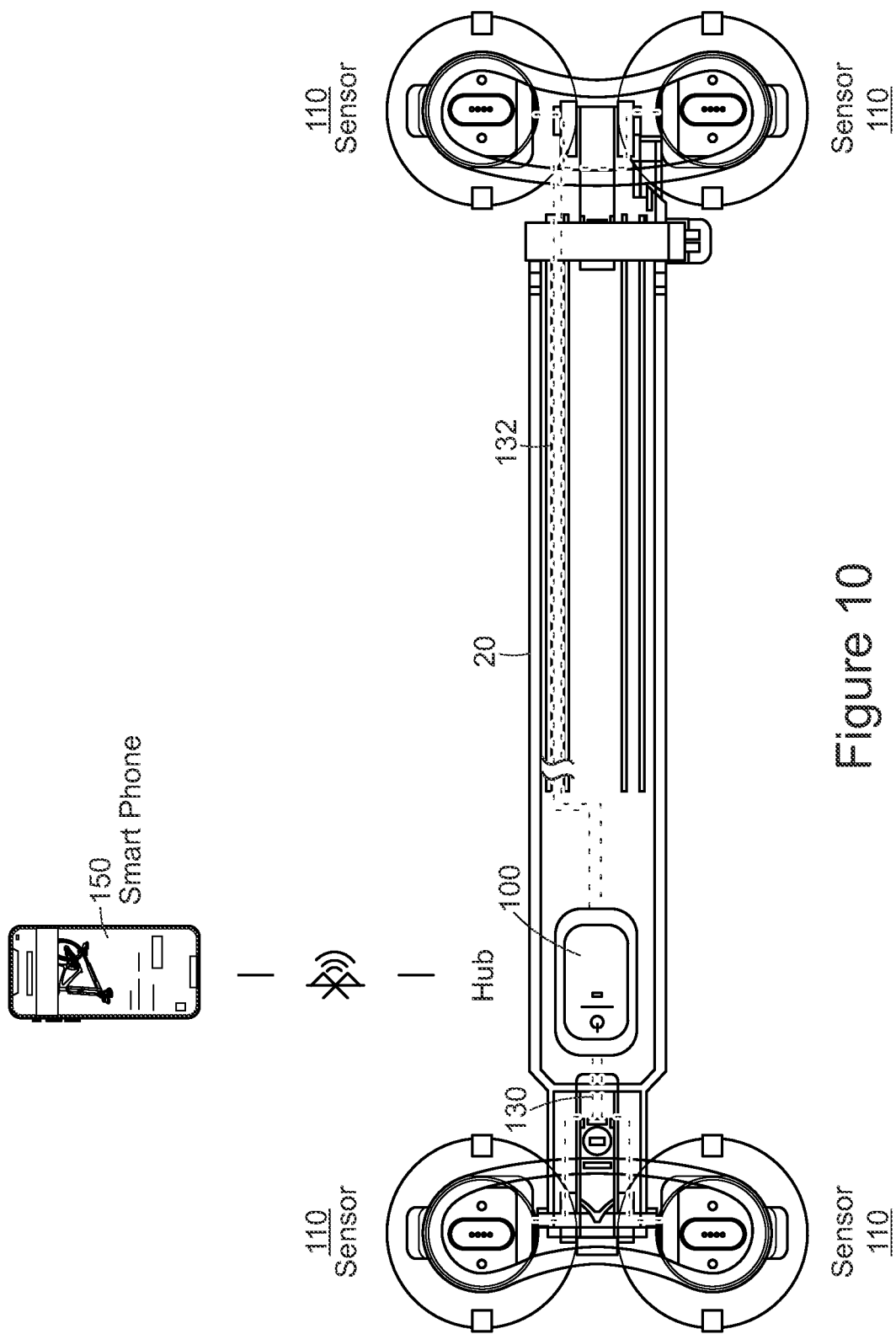

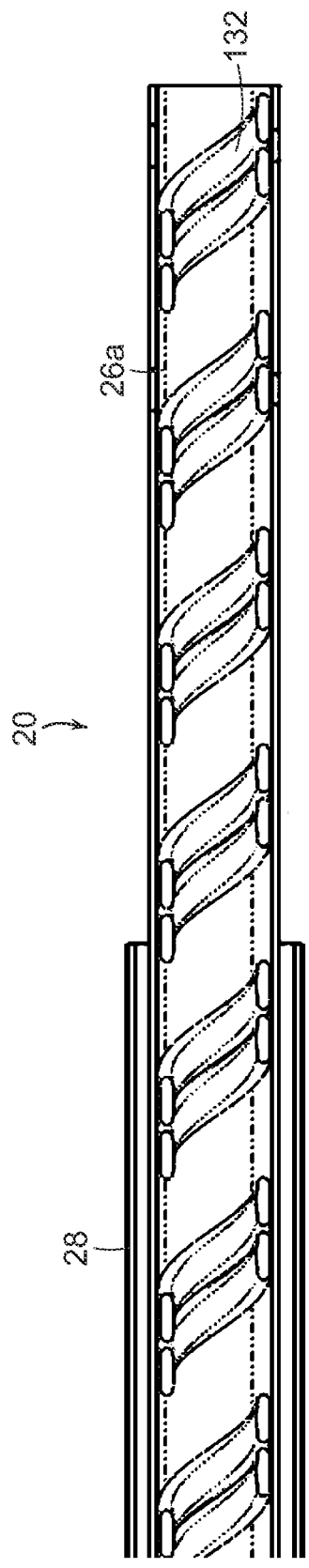
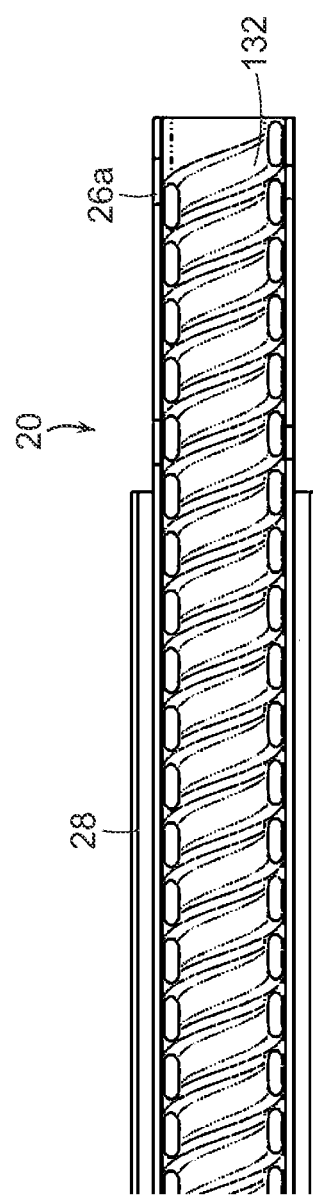
Figure 11A
Figure 11B

CARRIER DEVICE FOR SECURING AN ACCESSORY TO A VEHICLE

FIELD OF THE INVENTION

The invention relates, in part, to a carrier device for securing an accessory to an object, such as a vehicle.

BACKGROUND

There are a variety of known types of carrier devices for securing an accessory to a vehicle. For example, there are racks designed to secure recreational equipment, such as bicycles, skis, snowboards and surfboards to a vehicle. These racks are typically attached to the roof, and/or the rear of the vehicle. Many of these racks have permanent mounting brackets attached to the vehicle. Also, many vehicles require a custom fit rack shaped and sized for a specific make and model vehicle.

SUMMARY OF THE INVENTION

According to one aspect, a carrier device for securing an accessory to a vehicle is provided. The carrier device includes a support frame having a first end and a second end, and a first suction cup pivotally mounted on the support frame. The position of the first suction cup relative to the support frame is adjustable to selectively couple the carrier device to a vehicle. The first suction cup includes a suction cup housing defining a suction chamber therein, a vacuum pump configured to selectively adjust the pressure within the suction chamber to couple the first suction cup to a vehicle, and a first pressure sensor positioned within the suction cup housing to detect suction chamber pressure information. The first suction cup also includes at least one electrical line coupled to the first pressure sensor to transmit suction chamber pressure information to a location outside of the first suction cup, and an integrally molded housing formed around the at least one electrical line to prevent pressure loss within the suction chamber.

According to another aspect, a carrier device for securing an accessory to a vehicle is provided. The carrier device includes a support frame having a first end and a second end, a first suction cup pivotally mounted on the support frame, where the position of the first suction cup relative to the support frame is adjustable to selectively couple the carrier device to a vehicle. The first suction cup includes a suction cup housing defining a suction chamber therein, a vacuum pump configured to selectively adjust the pressure within the suction chamber to couple the first suction cup to a vehicle, and a first pressure sensor positioned within the suction cup housing to detect suction chamber pressure information. The first suction cup also includes a power source positioned within the suction cup housing and coupled to the first pressure sensor, and a short range wireless module positioned within the suction cup housing and coupled to the first pressure sensor to selectively pair the first pressure sensor to a nearby electronic device to transmit the suction chamber pressure information to a location outside of the first suction cup.

BRIEF DESCRIPTION OF THE DRAWINGS

FIG. 8A illustrates one embodiment of a carrier device for securing a bicycle to a vehicle;

FIG. 8B illustrates a detailed view of the suction cup shown in FIG. 8A;

FIG. 10 is a top view of one embodiment of a carrier device which includes a central hub that interacts with a nearby electronic device, such as a smart phone;

FIG. 11A is a cross-sectional view of a portion of a carrier device support frame according to one embodiment which includes an adjustable length wire shown in a first position;

FIG. 11B is a cross-sectional view of a portion of the carrier device support frame of FIG. 11A with the adjustable length wire shown in a compressed position;

DETAILED DESCRIPTION

Figure 1:
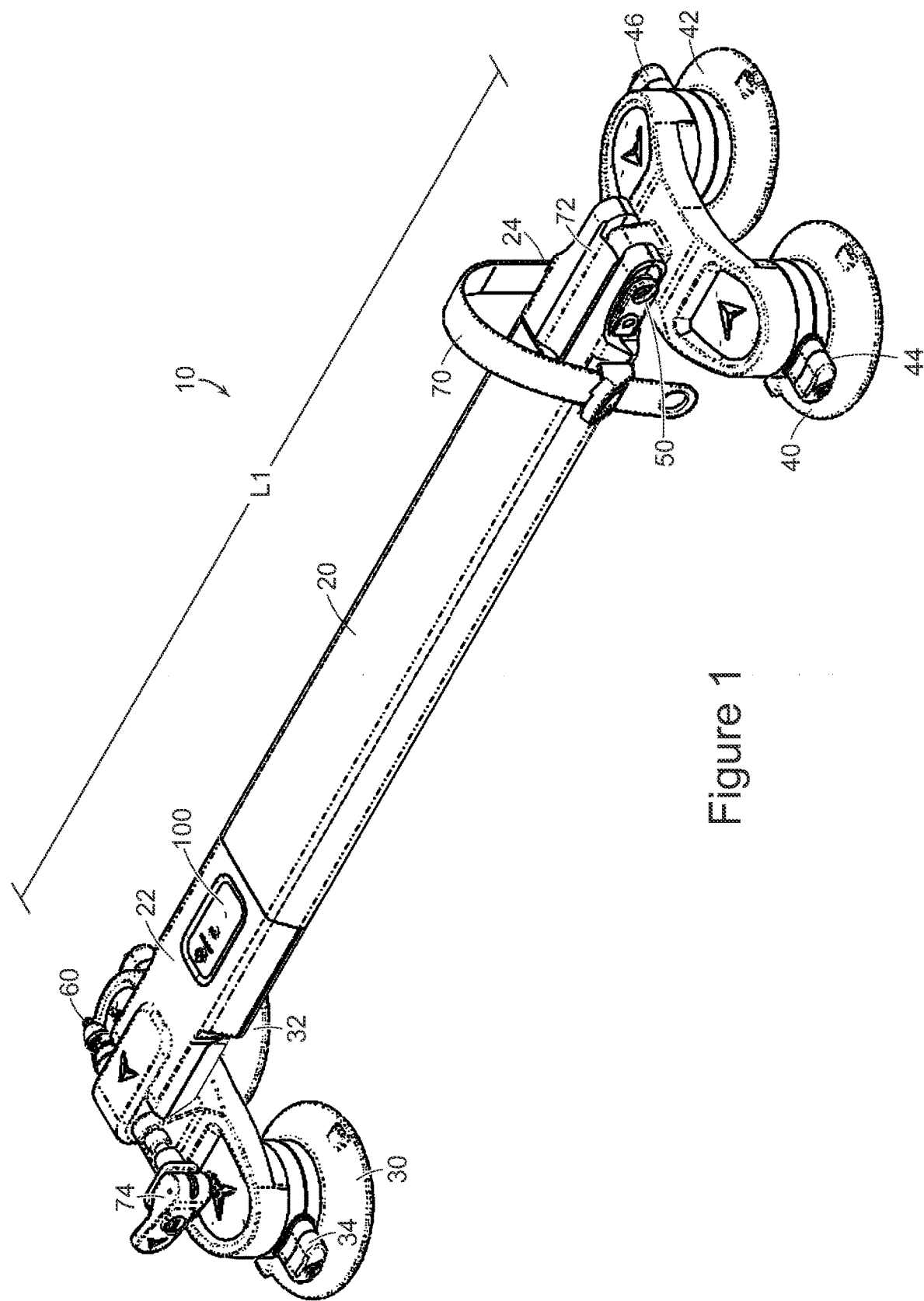
FIG. 1 is a perspective view of a carrier device according to one embodiment shown in a first position.

The present disclosure is directed to a carrier device for securing an accessory to a vehicle. As set forth in more detail below, the carrier device itself is configured to selectively attach and detach from the vehicle. The carrier device may be configured to secure a variety of types of accessories to a vehicle, such as, but not limited to bicycles, skis, snowboards, surfboards, luggage, cameras, cargo boxes, etc. This disclosure builds upon Applicant's earlier U.S. patent application Ser. No. 17/248,970 filed on Feb. 16, 2021, the contents of which are incorporated by reference in its entirety.

Aspects of the present disclosure are directed to a carrier device that includes one or more suction cups to selectively couple the carrier device to the vehicle. As set forth in more detail below, one or more vacuum pumps are configured to selectively adjust the pressure within the suction cup. One of ordinary skill in the art would recognize that adjusting the pressure within the suction cup creates a partial vacuum within the suction cup causing the suction cup to adhere to an adjacent surface. The carrier device may include a plurality of spaced apart suction cups used to selectively adhere to an outside surface of a vehicle to attach the carrier device to the vehicle. As set forth in more detail below, when desired, the pressure within the suction cups is adjusted to remove the partial vacuum to detach the suction cups (and carrier device) from the vehicle.

In one embodiment, a suction cup carrier device is provided with safety features which enable the driver of the vehicle to monitor the pressure within the suction cups. As set forth in more detail below, aspects of the present disclosure are directed to a carrier device with one or more suction cups that include a sensor within the suction cup to detect pressure information. The suction cup may be configured to transmit the pressure information to a location outside of the suction cup. In one particular embodiment, wireless technology, such as Bluetooth technology, is incorporated into the carrier device such that the carrier device may be paired with a nearby electronic device, such as the driver's smart phone.

The inventors recognized that it was critical to prevent pressure loss within the suction cup. As set forth in more detail below, the inventors developed ways to prevent pressure loss within the suction cup. In a first embodiment, an electrical line is coupled to the sensor to transmit the pressure information to a location outside of the suction cup. Through experimentation, the inventors recognized that it was difficult to fully seal around the electrical line and that pressure loss could occur around the electrical line. As set forth in more detail below, and as shown in FIGS. 14-19, in one embodiment, the electrical line is integrally molded with a surrounding housing to prevent pressure loss within the suction cup chamber. As set forth in more detail below, in another embodiment shown in FIG. 20, an electrical line may not pass through the suction cup housing, and instead, a wireless module may be positioned within the suction cup to transmit pressure information to a location outside of the suction cup.

In one embodiment, the carrier device is configured to be used with a wide variety of shaped and sized vehicles. For example, in one embodiment, a carrier device has a plurality of suction cups that are pivotally mounted to a support frame. The suction cups can rotate relative to the support frame based upon the shape and size of the vehicle. As set forth in more detail below, a suction cup may be mounted at each end of a support frame and each suction cup may rotate independent of each other. In one embodiment, a carrier device has a plurality of suction cups coupled to a support frame and the length of the support frame is adjustable to adapt to the size of a vehicle, and/or to adapt to the size of an accessory. As set forth in more detail below, the support frame may adjust between a more compact collapsed position and a longer extended position to enable the carrier device to be used with a variety of shaped and sized vehicles and/or accessories.

Figure 2:
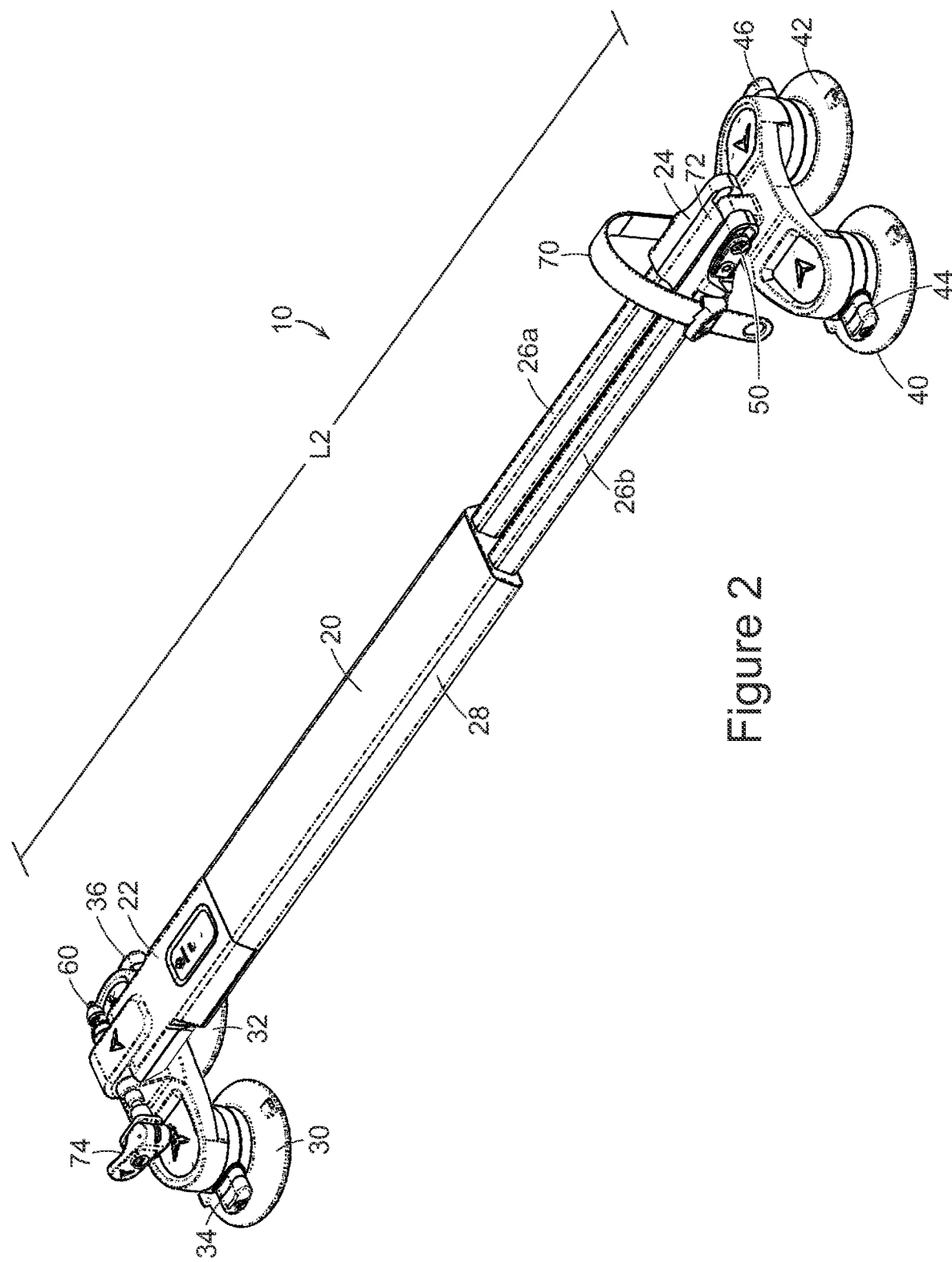
FIG. 2 is a perspective view of the carrier device of FIG. 1 shown in a second extended length position.

FIGS. 1-13 disclose a general overview of the carrier device, which will now be discussed. FIGS. 1-6 illustrate one embodiment of a carrier device 10 in greater detail. As illustrated, the carrier device 10 includes a support frame 20, with at least a first suction cup 30 and second suction cup 40. In one illustrative embodiment, the first suction cup 30 is positioned at a first end 22 of the support frame 20 and the second suction cup 40 is positioned at a second end 24 of the support frame 20. It should be appreciated that in another embodiment, one or more suction cups may be positioned along the length of the support frame 20. In one illustrative embodiment, the support frame 20 is substantially linear in shape with a straight portion extending between the first and second suction cups 30, 40. In another embodiment, the support frame 20 may include one or more curved portions, as the present disclosure is not limited in this respect. Furthermore, as shown in FIGS. 1-2 and as described in more detail below, the carrier device 10 may also include third and fourth suction cups 32, 42.

As shown in FIGS. 1-2, the support frame 20 may have an adjustable length. In FIG. 1, the support frame 20 is in a collapsed position having a length, L1. In contrast, in FIG. 2, the support frame is in an extended position having a length L2. In the illustrative embodiment shown in FIG. 2, the support frame 20 has a telescoping first component 26a, 26b that is slidable within a second support frame component 28. As shown, the telescoping first component 26a, 26b may include one or more beams that slide within channels formed within the second support frame component 28. As set forth in more detail below, this adjustable length support frame enables a user to fit the carrier device 10 to different sized and shaped vehicles, and/or it also may enable the carrier device 10 to be used with different sized and shaped accessories. For example, in one embodiment, the adjustable length support frame enables one to use the carrier device with bicycles having different frame sizes.

Figure 15:
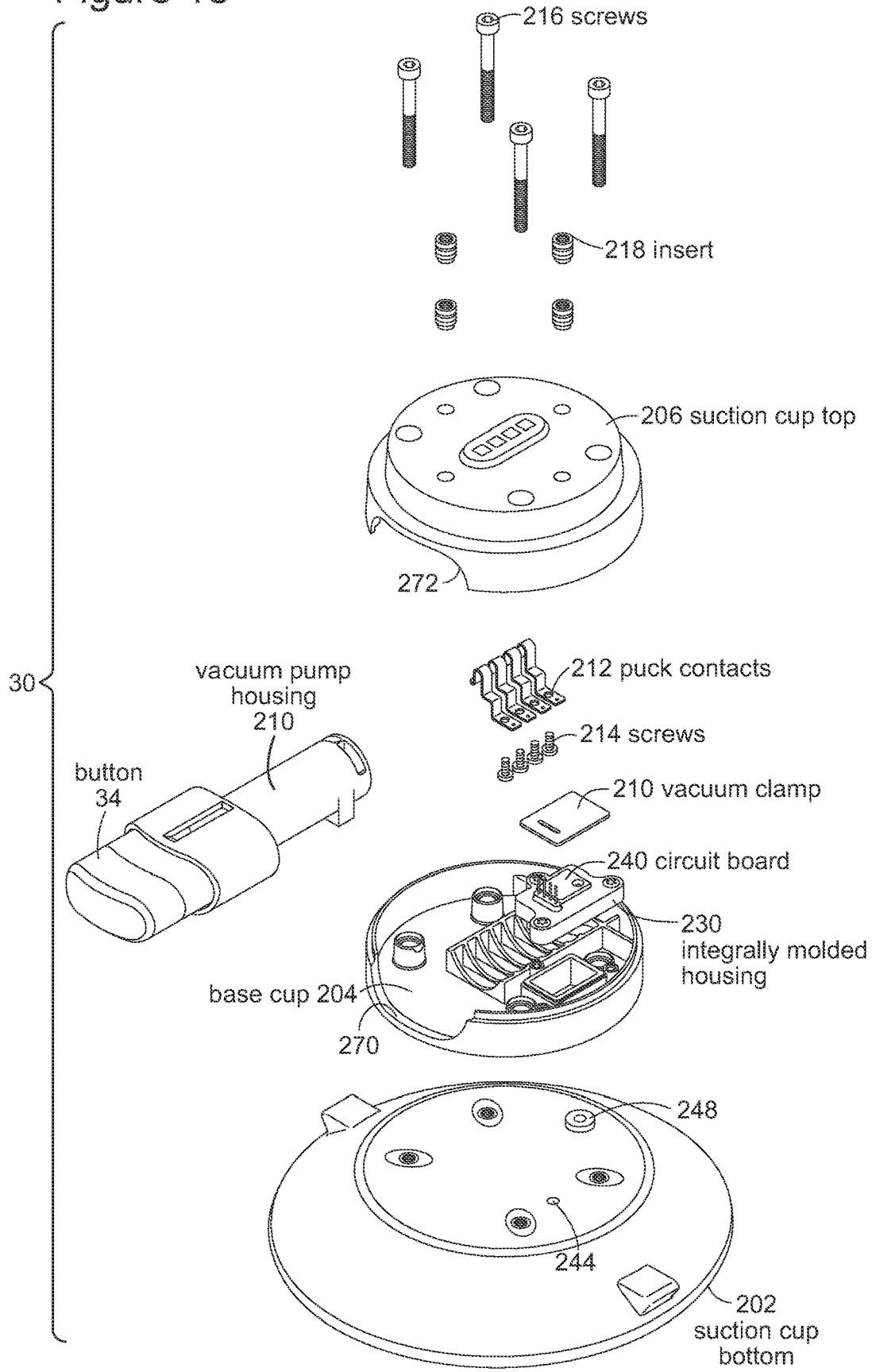
FIG. 15 is an exploded assembly view of the first suction cup shown in FIG. 14.

As shown in FIGS. 3-6, one or more suction cups 30, 40 may be positioned at each end 22, 24 of the support frame. It should be appreciated that the suction cups 32, 42 located on the opposite side of the carrier device are not visible in these side views. As mentioned above, each suction cup 30, 40 is configured to selectively couple the carrier device 10 to a vehicle. One or more vacuum pumps are associated with the suction cups and are configured to selectively adjust the pressure within the suction cup to create a partial vacuum within the suction cup causing the cup to adhere to an adjacent vehicle surface. In one embodiment, each suction cup 30, 32, 40, 42 includes a button 34, 36, 46 on its side which, when pressed, activates the associated vacuum pump to cause the suction cup to be secured to the adjacent vehicle surface. Buttons 34, 36, 46 are shown in FIGS. 1-2, and it should be appreciated that although not visible in these drawings, suction cup 32, may also have a button. As set forth in more detail below and as shown in FIG. 15, in one embodiment, each vacuum pump is located within a vacuum pump housing 220 positioned inside each suction cup 30, 32, 40, 42. The present disclosure contemplates various types of known suction cup configurations.

Figure 4:
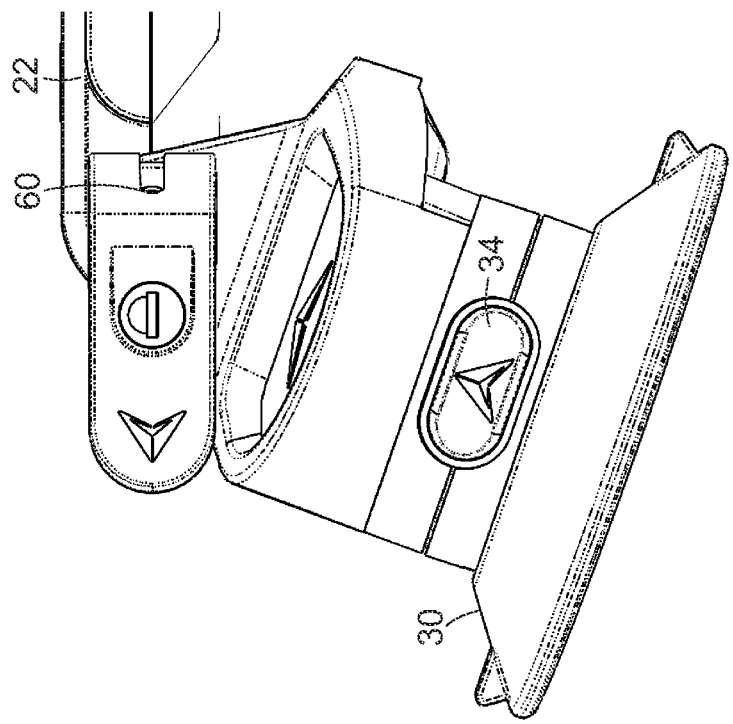
FIG. 4 is a side view of the first end of the carrier device of FIG. 3 shown with the first suction cup rotated into a second position.
Figure 3:
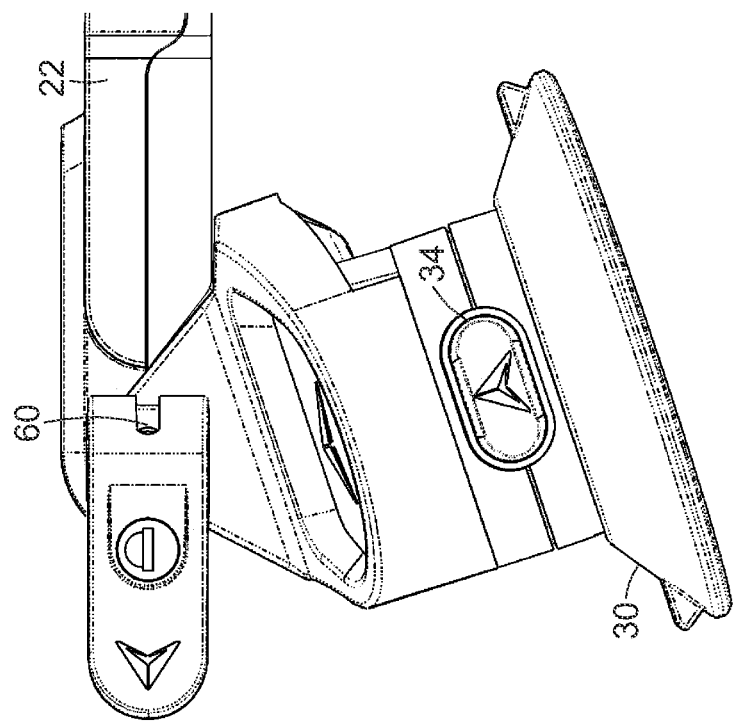
FIG. 3 is a side view of a first end of a carrier device according to one embodiment shown with a first suction cup in a first position.
Figure 6:
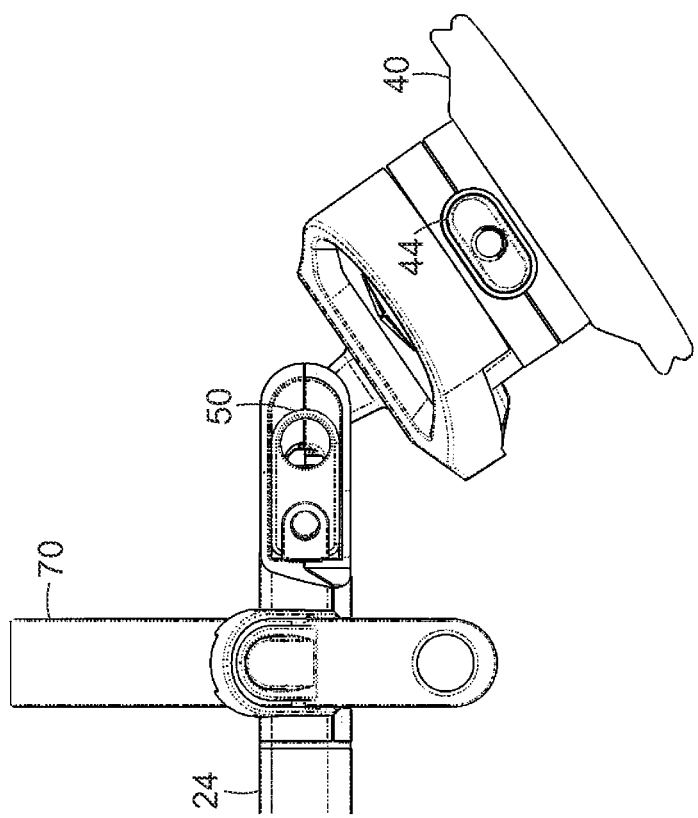
FIG. 6 is a side view of the second end of the carrier device of FIG. 5 shown with the second suction cup rotated into a second position.
Figure 5:
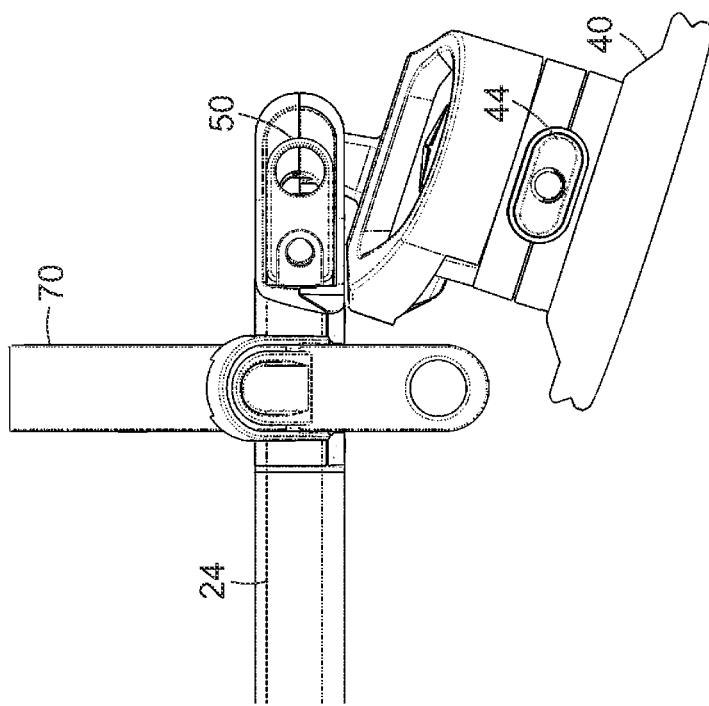
FIG. 5 is a side view of a second end of a carrier device according to one embodiment shown with a second suction cup in a first position.
Figure 7A:
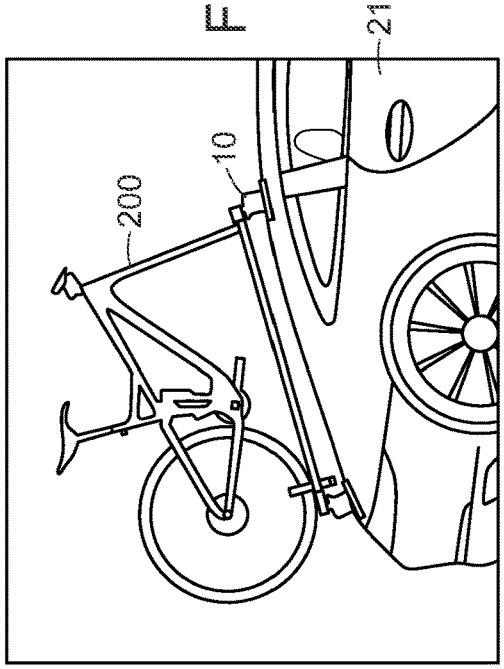
FIGS. 7A-7D illustrate a carrier device coupled to four different shaped vehicles.
Figure 7B:
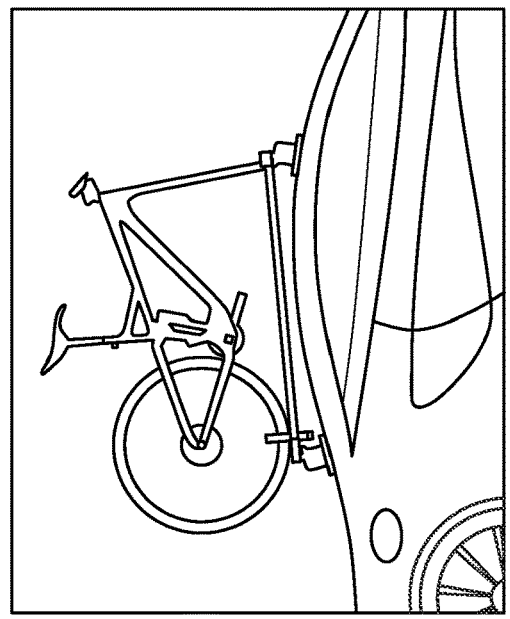
Figure 7C:
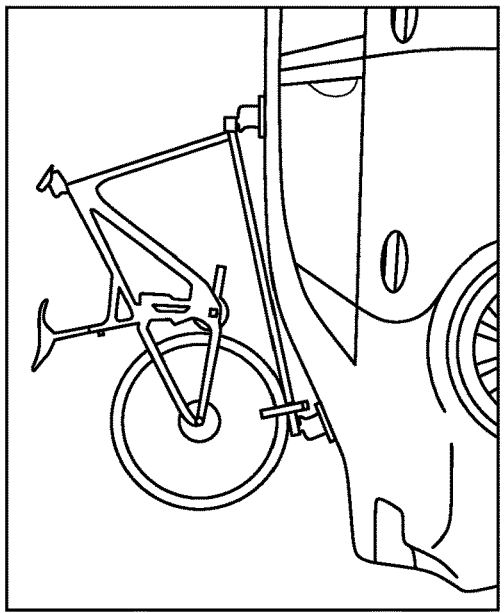
Figure 7D:
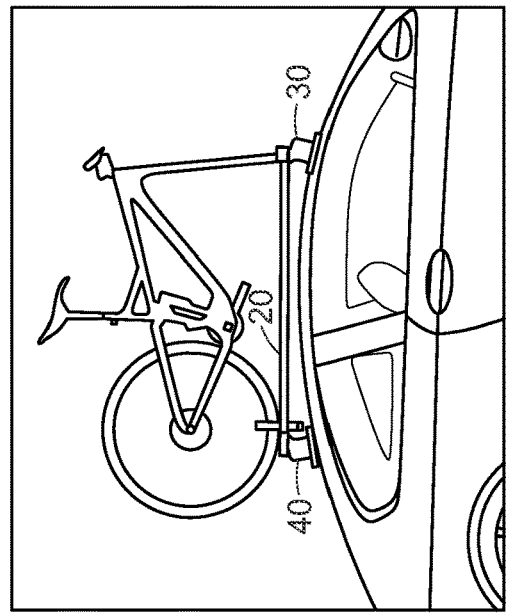

In one embodiment, first suction cup 30 is rotatable between a first position shown in FIG. 3, and a second position shown in FIG. 4. Similarly, a second suction cup 40 may be rotatable between a first position shown in FIG. 5, and a second position shown in FIG. 6. In one embodiment, first suction cup 30 is rotatable at least about 140°, and second suction cup 40 is rotatable at least about 180°. However, it should be appreciated that in another embodiment, the angle of rotation for each suction cup may vary. As shown in FIGS. 3-4, the first suction cup 30 is rotatable about a first hinge 60 which defines a first pivot axis, and as shown in FIGS. 5-6, the second suction cup 40 is rotatable about a second hinge 50 which defines a second pivot axis. As shown, the first and second hinges 60, 50 are located on the support frame 20, with first hinge 60 positioned on the first end 22 of the support frame 20 and the second hinge 50 positioned on the second end 24. As shown in FIGS. 3-4, in one embodiment, the first hinge 60 which defines the first pivot axis is positioned over the first suction cup 30. Furthermore, as shown in FIGS. 5-6, in one embodiment, the second hinge 50 which defines the second pivot axis is positioned over the second suction cup 40. This configuration where the hinge 60, 50 is positioned directly over the suction cup 30, 40 may provide enhanced rigidity. It should be recognized that in another embodiment, the suction cups 30, 40 may pivot about a pivot axis having a different configuration. For example, in one embodiment, another type of rotational coupling, such as a ball and socket joint, may be provided.

Furthermore, as shown in FIGS. 1-2, each end 22, 24 of the support frame 20 may include more than one suction cup. For example, as shown in FIGS. 1-2, a third suction cup 32 is also rotatable about the first hinge 60, and a fourth suction cup 42 is rotatable about the second hinge 50. It should be appreciated that the rotational position of the first, second, third and fourth suction cups 30, 40, 32, 42 relative to the support frame 20 is adjustable to selectively couple the carrier device to a vehicle. In the embodiment shown in FIGS. 1-2, the first and third suction cups 30, 32 are coupled together such that they move together about the first hinge 60, and the second and fourth suction cups 40, 42 are also coupled together such that they move together about the second hinge 50. However, it should be appreciated that in another embodiment, these suction cups 30, 32, 40, 42 may rotate independently of each other.

FIGS. 7A-7D illustrate a carrier device 10 coupled to four different shaped vehicles 210. As shown, an accessory, such as a bicycle 200 is secured to the carrier device 10. Details regarding how the bicycle 200 may be secured to the carrier device are disclosed below. As shown in FIGS. 7A-7D, the angle of the first and second suction cups 30, 40 relative to the support frame 20 is adjusted to match the contour of the outer surface of the vehicle 210. Furthermore, as shown in FIGS. 7A-7D, the length of the support frame 20 can also adjusted based upon the size and shape of the vehicle 210 and/or the size and shape of the bicycle 200, or other accessory. FIGS. 7A-7D demonstrate that the carrier device 10 may be used with a variety of vehicles ranging from compact cars to large SUV's.

One of ordinary skill in the art will recognize that the carrier device 10 may include one or more attachment mounts for securing the accessory to the carrier device 10. For example, as shown in FIGS. 1-2, the carrier device 10 may include a wheel strap 70 positioned at one end 24 of the support frame 20 which is configured to receive a bicycle wheel. As shown, the end 24 of the support frame 20 may also include a wheel tray 72 shaped to retain the bicycle wheel. As shown in FIG. 8A, the front bicycle wheel may be removed to secure the front of the bicycle to a fork mount 76 located on the first end 22 of the support frame 20. As shown in FIGS. 1-2, the carrier device 10 may also include a quick release locking skewer 74 positioned at the first end 22 of the support frame 20 to lock the bicycle to the fork mount 76. One of ordinary skill in the art would recognize that other types of attachment mounts may be desired for mounting other types of accessories to a vehicle. It should be appreciated that in another embodiment, the carrier device 10 may include various attachment mounts such as, but not limited to various straps, tethers, racks, bars, through axles, wheel clamps, or frame clamps. It should also be recognized that various keys/locks may be incorporated into one or more attachment mounts to prevent theft of the bicycle (or other accessory) from the carrier device.

As shown in FIG. 8B, the suction cup 30 has a button 34 (i.e. plunger cap) on its side which, when pressed, activates the associated vacuum pump (located within the vacuum pump housing 220 shown in FIG. 15 within the suction cup 30) to secure the suction cup 30 to the adjacent vehicle surface. One of ordinary skill in the art will appreciate that each button 34, 36, 44, 46 may be pumped to secure each suction cup 30, 32, 40, 42 to the vehicle. When desired, the pressure within the suction cups is adjusted to remove the partial vacuum to detach the suction cups (and carrier device) from the vehicle. For example, a button may be provided on each suction cup to assist in detaching the suction cups from the vehicle.

Figure 9:
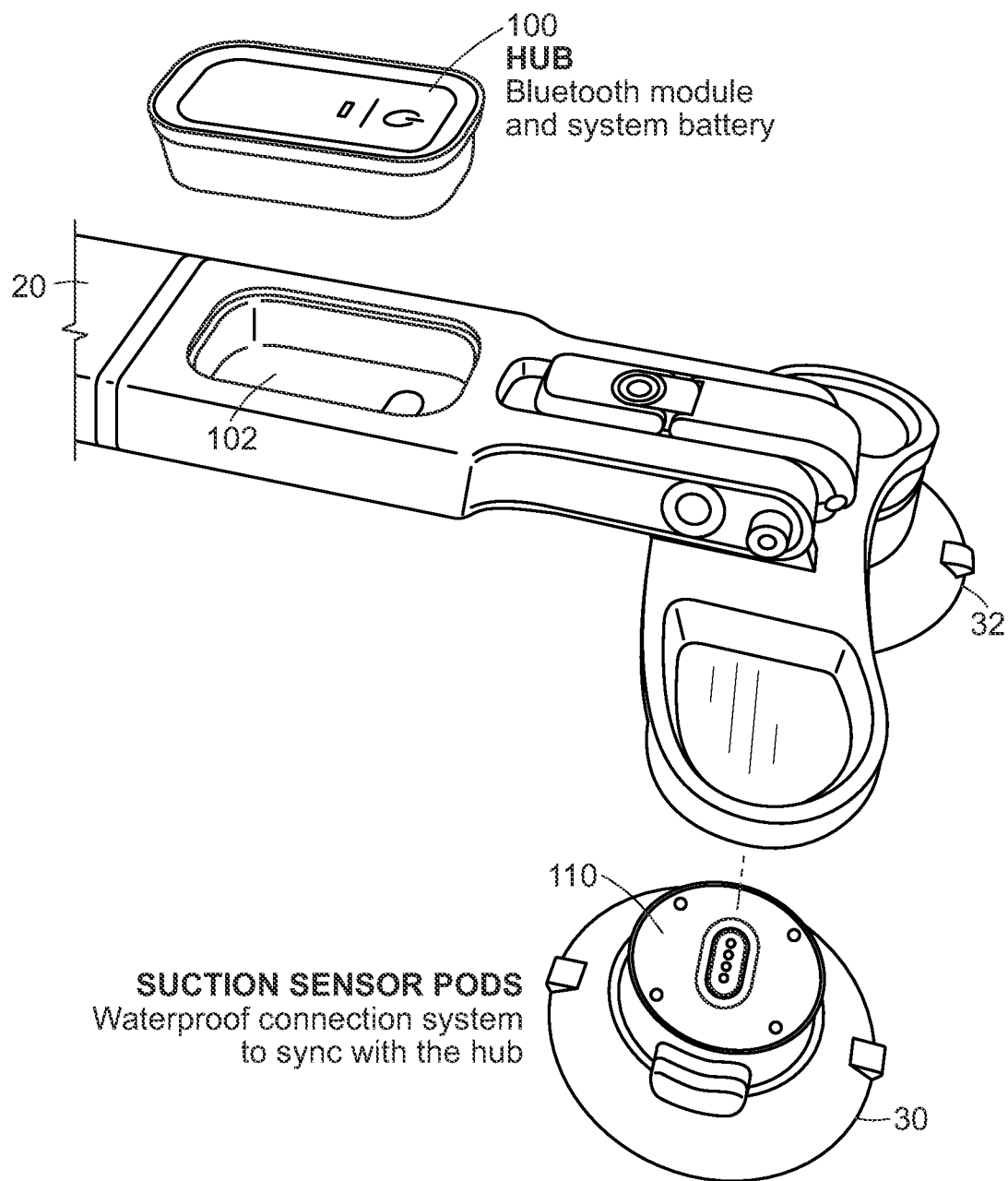
FIG. 9 illustrates one embodiment of a carrier device which includes a central hub.

Turning now to FIGS. 9-10, a high level overview of some of the electrical components of the carrier device 10 will now be discussed. As set forth in more detail below, aspects of the present disclosure are directed to a suction cup carrier device with safety features which enable the driver of the vehicle to monitor the pressure within the suction cups 30, 32, 40, 42. In one embodiment, it may be desirable for the pressure within each suction cup 30, 32, 40, 42 to be approximately 700 psi or less. It may also be desirable for the carrier device 10 to alert the driver if the pressure within any of the suction cups 30, 32, 40, 42 is not at this threshold pressure.

As shown in the exploded view shown in FIG. 9, a suction sensor pod (i.e. first pressure sensor 110) may be associated with the first suction cup 30. Similarly, a second pressure sensor (not specifically shown) may likewise be associated with the second suction cup 40. These pressure sensors 110 are configured to detect information about the pressure within the suction cups 30, 40. As also shown in FIG. 9, the carrier device 10 may include a central hub 100 associated with the support frame 20. The central hub 100 may include a power source electrically coupled to the pressure sensors 110, and a short range wireless interconnection module to selectively pair the pressure sensors 110 to a nearby electronic device, for example via Bluetooth® technology, to transmit suction cup pressure information to a user. As shown in FIG. 10, in one embodiment, the nearby electronic device is a smart phone 150. In one embodiment, the central hub power source includes a battery which acts as the central power source for all of the suction cups 30, 32, 40, 42.

As shown in FIG. 9, the central hub 100 may be housed within a recess 102 formed within the support frame 20. Furthermore, as shown in FIG. 10, wires 130, 132 extend within the support frame to electrically connect the central hub 100 to each of the pressure sensors 110. As shown in FIG. 10, a pressure sensor 110 may be associated with each of the four suction cups 30, 32, 40, 42.

As shown in FIG. 10, in one embodiment, the carrier device 10 employs Bluetooth® technology to pair the central hub 100 to a smart phone 150. The central hub 100 may include a power button, a pairing button (to connect the central hub 100 to the smart phone 150), and a status LED light to indicate power on/off and pairing status. The smart phone 150 may interact with the central hub 100 to provide suction cup pressure information. In one embodiment, the smart phone 150 may include an app configured to alert the driver (audible and/or visual alert) if the pressure within any of the suction cups 30, 32, 40, 42 is not within the desired range. The app may also be configured to also provide continuous real-time pressure data for each of the suction cups 30, 32, 40, 42. In one embodiment, the carrier device 10 may also include a visual indication on the suction cup 30, 32, 40, 42 itself to alert the user whether the pressure within the suction cup 30, 32, 40, 42 is within the desired range. For example, the buttons 34, 44, 36, 46 may include a red portion that is visible only when the pressure within the suction cup is below a predetermined amount.

As shown in FIGS. 11A-11B, in one embodiment, the carrier device 10 has an adjustable length wire 132 coupling the first pressure sensor 110 to the central hub 100. As shown in these cross-sectional views, the adjustable length wire 132 is positioned within the support frame 20 such that the length of the wire 132 is adjustable to the length of the support frame 20. As mentioned above, the length of the support frame 20 may be adjustable to enable a user to fit the carrier device 10 to different sized and shaped vehicles. In the illustrative embodiment, the adjustable length wire 132 has a helical spring shape. Other adjustable length wire configurations such as, for example, other coiled or spring configurations and/or wires made of an elastic material, are also contemplated.

In FIG. 11A, the adjustable length wire 132 extends within the telescoping first component 26a of the support frame 20 in a first extended position. In contrast, in FIG. 11B, the adjustable length wire 132 extends within the telescoping first component 26a of the support frame 20 in a collapsed position. It should be appreciated that when the carrier device 10 is in an extended length position as shown in FIG. 2, the adjustable length wire 132 may be extended as shown in FIG. 11A. And when the carrier device 10 has a shorter collapsed length as shown in FIG. 1, the adjustable length wire 132 may be in a collapsed position as shown in FIG. 11B. In this respect, the adjustable length wire 132 enables the length of the support frame 20 to vary without compromising the electrical connection between the pressure sensors 110 and the central hub 100. Although the embodiment disclosed in FIGS. 10-11 disclose wires 132 electrically connecting the pressure sensors 110 to the central hub 100, wireless connections and near-field connections are also contemplated.

Figure 12:
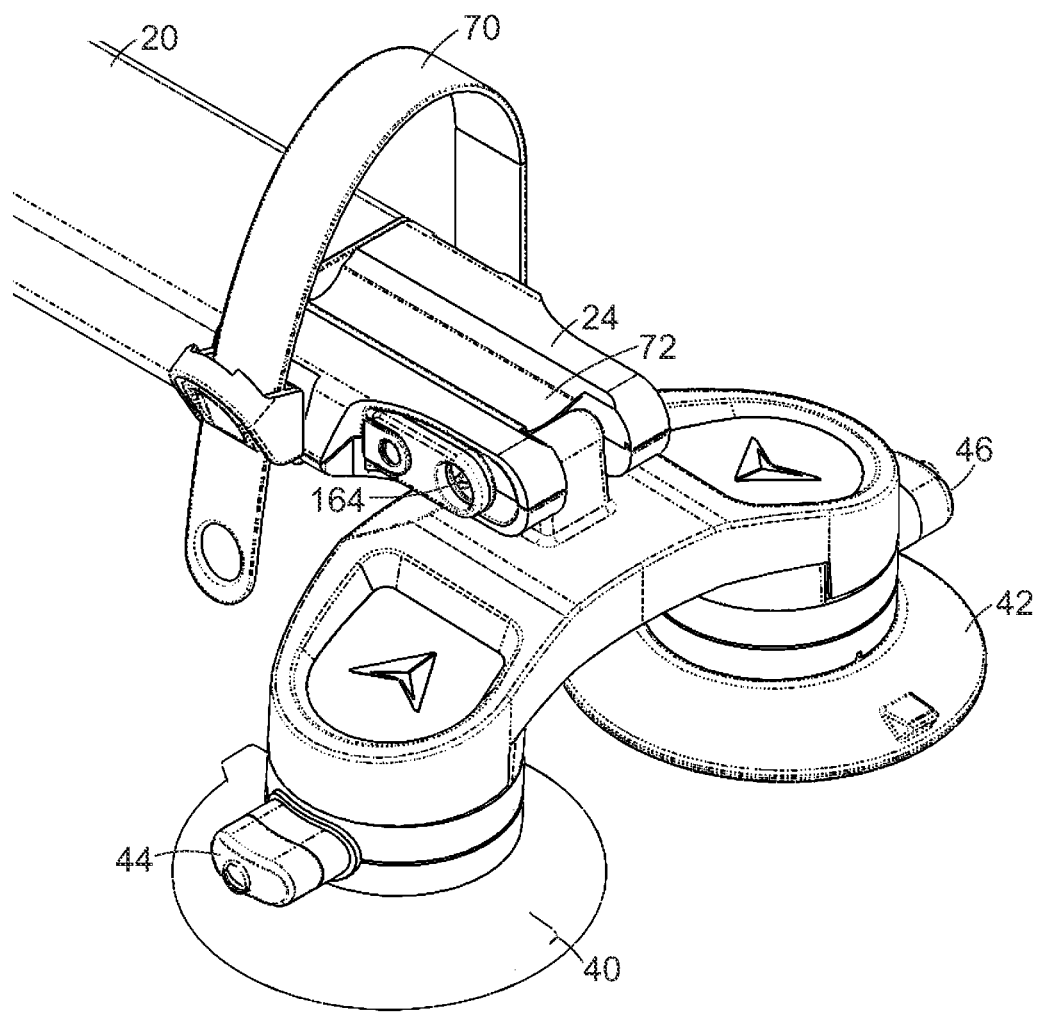
FIG. 12 illustrates a detailed view of one end of a carrier device according to one embodiment.
Figure 13:
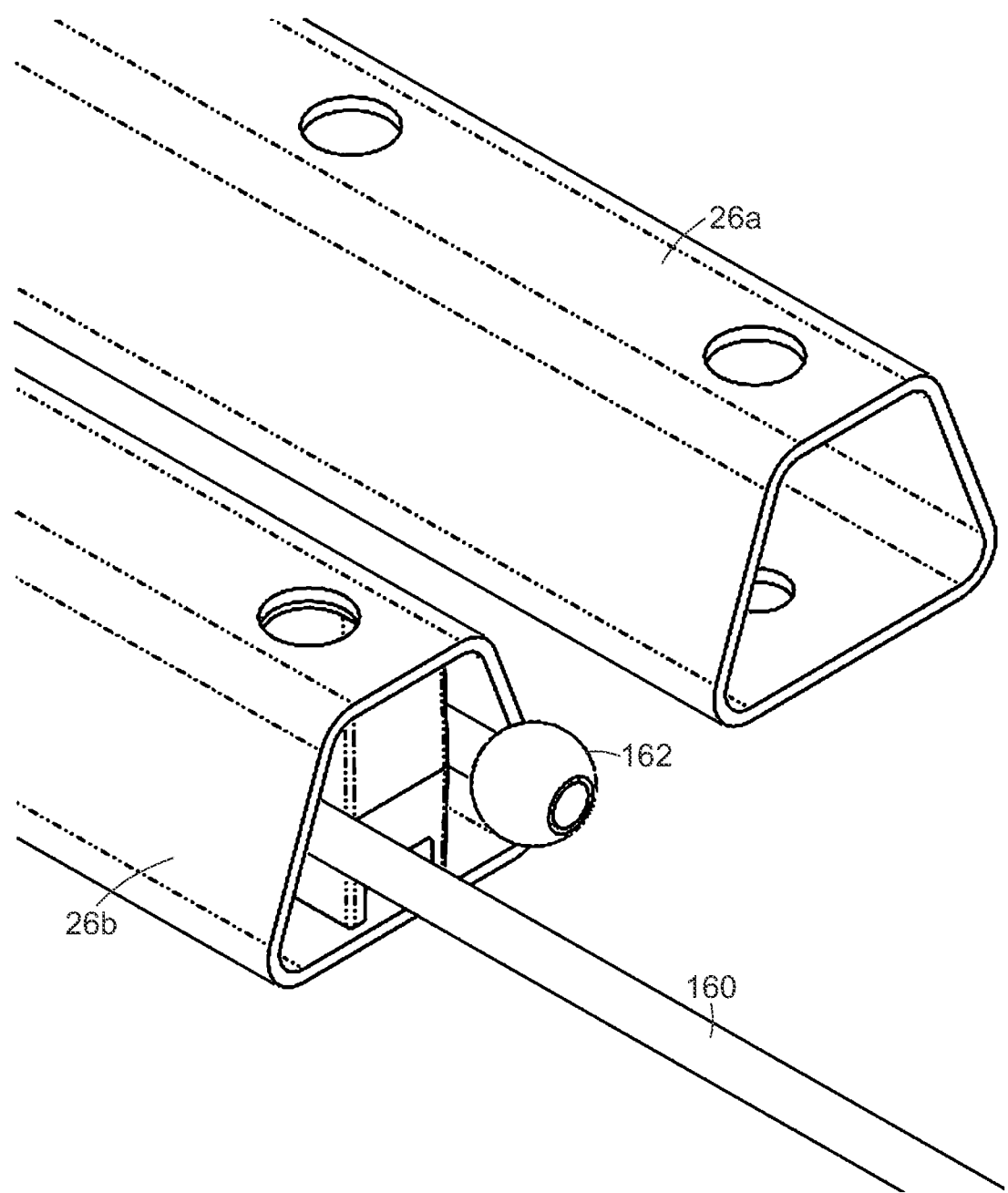
FIG. 13 illustrates a partially disassembled view of a portion of a carrier device according to one embodiment which includes a retractable security tether.

Turning now to FIGS. 12-13, one additional safety feature of the carrier device 10 will now be discussed. As shown in the partially disassembled view shown in FIG. 13, the carrier device 10 may include a retractable security tether 160. As shown in FIG. 13, the security tether 160 may be retracted into one of the telescoping beams 26b of the support frame 20. When the vehicle is parked, the driver may want to tether the carrier device 10 to the vehicle to prevent theft. In one embodiment, the security tether 160 may be pulled out from the telescoping beam and the end of the tether 160 may be shut in one of the vehicle's doors or windows. Once the vehicle is locked, the tether 160 is secured inside of the vehicle. Thus, even if the suction cups 30, 32, 40, 42 are detached from the vehicle, the tether 160 is still securing the carrier device to the vehicle. In one embodiment, the security tether 160 may be retracted out from an opening in the support frame 20, such as the opening 164 shown in the detailed end view of FIG. 12. As shown in FIG. 13, the end of the security tether 160 may include an anchor 162 which keeps the other end of the security tether 160 secured within the support frame 20. As shown in FIG. 13, the security tether 160 may extend within one of the telescoping beams 26b of the support frame 20, which the adjacent telescoping beam 26a is configured to hold the adjustable length wires 132.

Figure 14:
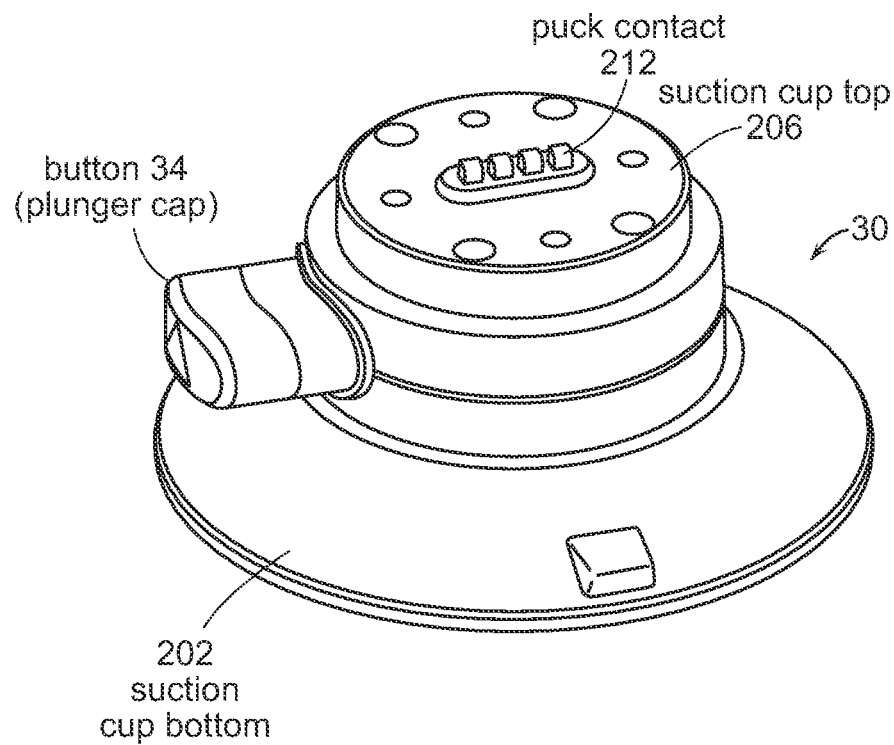
FIG. 14 is a perspective view of a first suction cup according to one embodiment.

FIGS. 14-19 illustrate one embodiment of the suction cup 30 in greater detail. The suction cup 30 has a suction cup housing that defines a suction chamber. In one embodiment, the suction cup housing includes a suction cup bottom 202 and a suction cup top 206. The suction cup bottom 202 is configured to contact a surface of a vehicle, and in one embodiment for example, may be made of rubber. Other portions of the suction cup housing, such as the suction cup top 206 may be made of a more rigid plastic material. As discussed above, the button 34 actuates the vacuum pump in communication with the suction chamber to create a partial vacuum within the suction cup chamber and cause the cup to adhere to an adjacent vehicle surface. As shown in FIG. 14, one or more electrical contacts, such as puck contacts 212, may extend out of the suction cup top 206 and may be coupled to the above described wires 130, 132 to electrically connect the central hub 100 (see FIGS. 9-10) to a pressure sensor 260 positioned inside of the suction cup 30 (see FIGS. 17-19).

Figure 16:
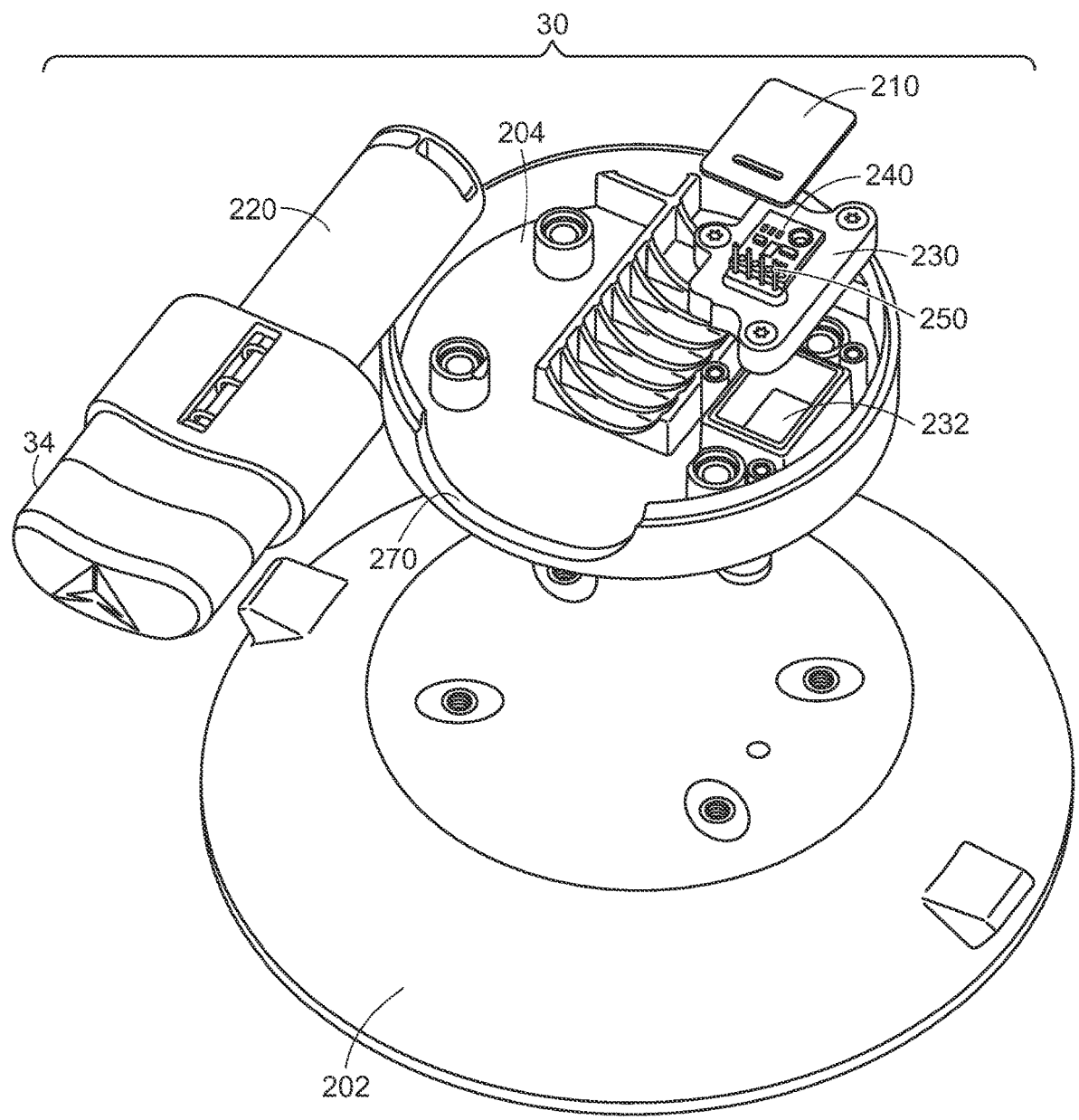
FIG. 16 is an exploded assembly view of a portion of the first suction cup shown in FIG. 14.

As shown in the exploded assembly views shown in FIGS. 15-16, the suction cup housing may also include a base cup 204 sandwiched between the suction cup top 206 and bottom 202. As shown in FIGS. 16-19, one or more electrical lines 250 may be coupled to a first pressure sensor 260 positioned within the suction cup 30 to transmit the pressure information to a location outside of the suction cup 30. It should be appreciated that the first pressure sensor 260 may include any conventional pressure sensor and may, for example, include a circuit board. The electrical lines 250 may be configured to contact the lower ends of the puck contacts 212 (shown in FIG. 15) to complete the electrical circuit to the central hub 100.

As mentioned above, the inventors recognized that it was critical to prevent pressure loss within the suction cup 30 to ensure that the suction cups 30, 32, 40, 42 couple the carrier device 10 to the vehicle. The inventors also recognized that it was difficult to fully seal around the electrical lines 250 and thus, that pressure loss could occur specifically around the electrical lines. As shown in FIGS. 15-19, in one embodiment, to overcome this problem, the one or more electrical lines 250 are integrally molded with a surrounding housing 230 to prevent pressure loss within the suction cup chamber. As shown, this integrally molded housing 230 is formed around the electrical lines 250. In one embodiment, the electrical line 250 includes at least one pin. The pin may be placed directly in a mold that is used to form the integrally molded housing 230. Various injection molded plastic materials may be used to integrally mold the housing 230 with the electrical lines 250. It should be appreciated that the electrical lines molded into the housing 230 may include one or more pins or wires as the disclosure is not limited in this respect. Through experimentation, the inventors recognized that integrally forming the housing 230 around the electrical lines 250 prevents pressure loss within the suction cup chamber. In one embodiment, the plastic is molded around the electrical lines/pins 250 to create an air tight seal.

Figure 17:
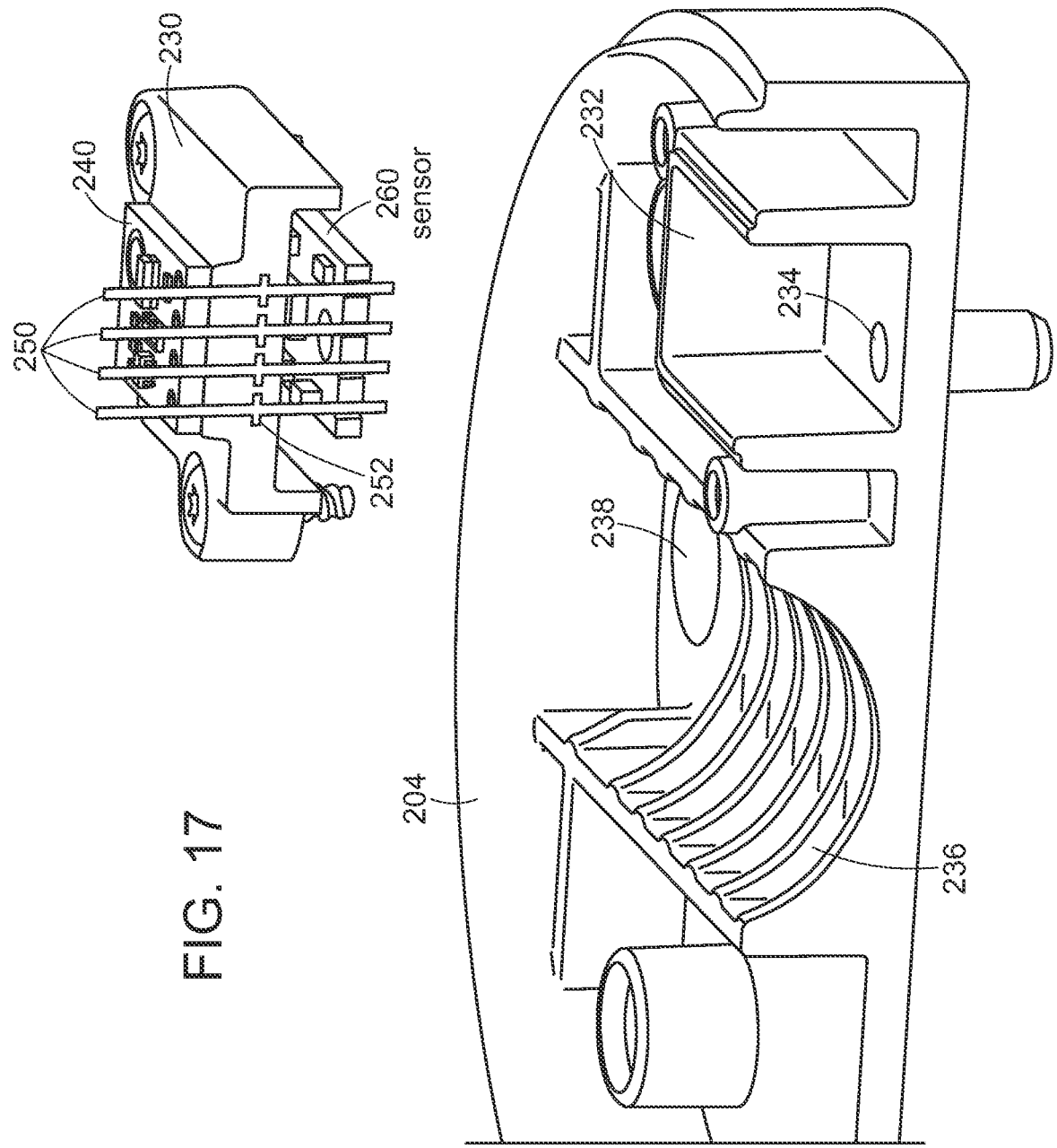
FIG. 17 is an exploded partial cross-sectional view of a portion of the first suction cup shown in FIG. 14.
Figure 19:
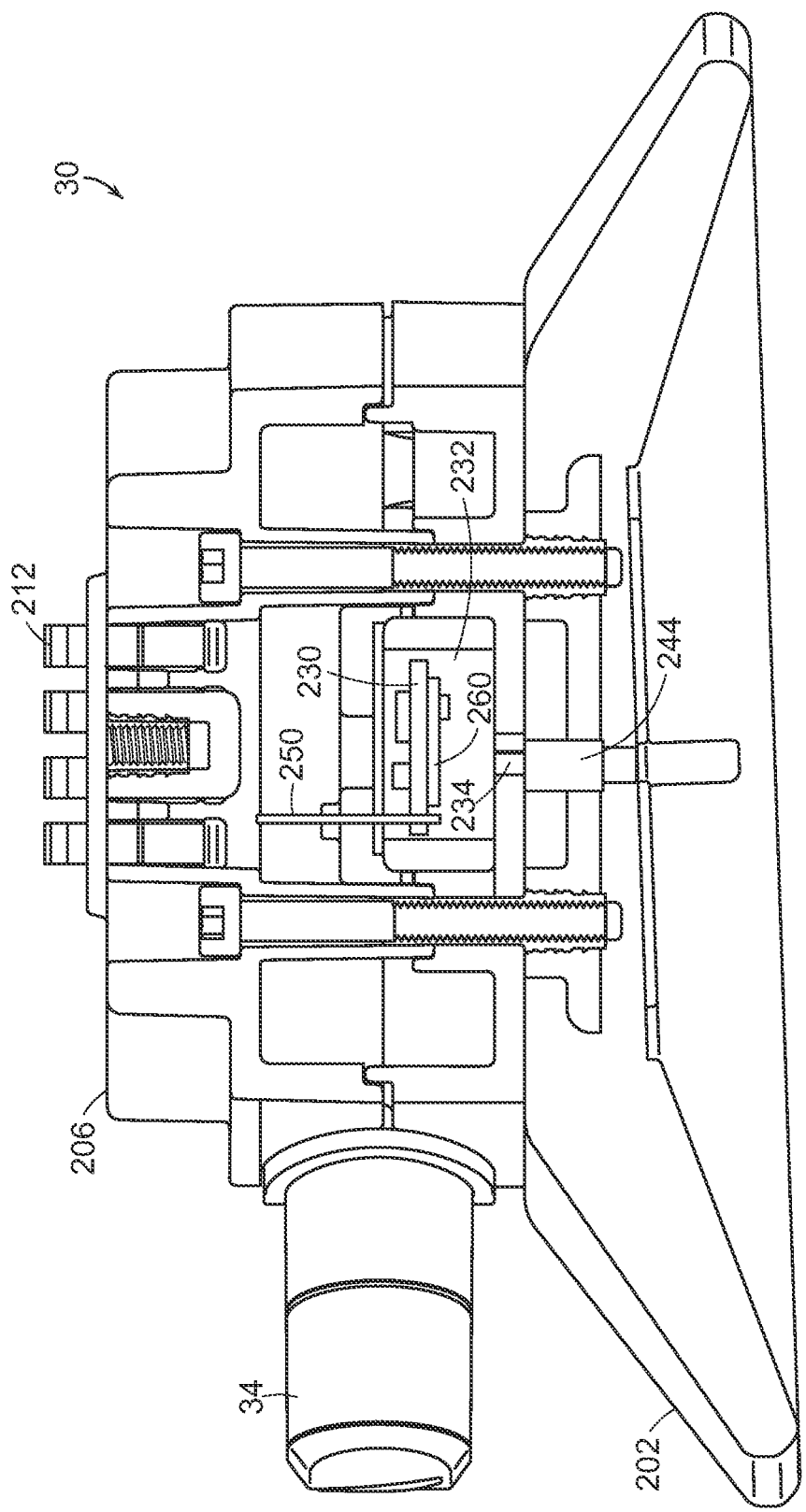
FIG. 19 is a cross-sectional view of the first suction cup shown in FIG. 14.

As shown in FIGS. 16-17 and 19, the base cup 204 may include a cavity 232 which is configured to receive the integrally molded housing 230 with electrical line 250. In this particular embodiment, a passageway 234 (see FIG. 17) extends from the bottom of the cavity 232 to the suction cup bottom 202. It should be recognized that the suction cup top 206, the base cup 204 (including cavity 232), the integrally molded housing 230 and suction cup bottom 202 together define a suction chamber therein.

As shown in FIGS. 15-16, in one embodiment, the base cup 204 includes a notch 270 configured to receive the vacuum pump, vacuum pump housing 220 and button 34. A similar notch 272 may also be formed in the suction cup top 206 to receive the vacuum pump, vacuum pump housing 220 and button 34. As also shown in FIG. 17, the base cup 204 may include a plurality of ribs 236 to hold the vacuum pump housing 220. In this embodiment, a passage way 238 extends from the bottom of the base cup 204 to the suction cup bottom 202, such that the passageway 238 also forms part of the suction chamber. One of ordinary skill in the art would appreciate that passageway 238 enables the vacuum pump to be in fluid communication with the rest of the suction chamber. As shown in FIGS. 15 and 19, there are similar passageways 244, 248 in the suction cup bottom 202 that align with the above described passageways 234, 238 such that the underside of the suction cup bottom 202 also forms part of the suction chamber when the suction cup bottom 202 is in contact with a vehicle.

As shown in FIGS. 15-17, in one embodiment, a circuit board 240 may be positioned on top of the integrally molded housing 230. The electrical lines 250 (and thus the first pressure sensor 260) may be in contact with the circuit board 240. To further assist in preventing pressure loss within the suction cup 30, a vacuum clamp 210 may also be provided on top of the integrally molded housing 230 and the clamp 210 may include a small opening for the electrical lines 250 to pass through. As shown, the vacuum clamp 210 may be positioned directly over the circuit board 240 to further insulate the electrical lines 250 and integrally molded housing 230 to prevent pressure loss within the suction chamber. Various mechanical fasteners, such as, but not limited to screws 214, 216 and inserts 218 shown in FIG. 15 may be provided to secure the above mentioned components together to form the suction cup 30.

Figure 18:
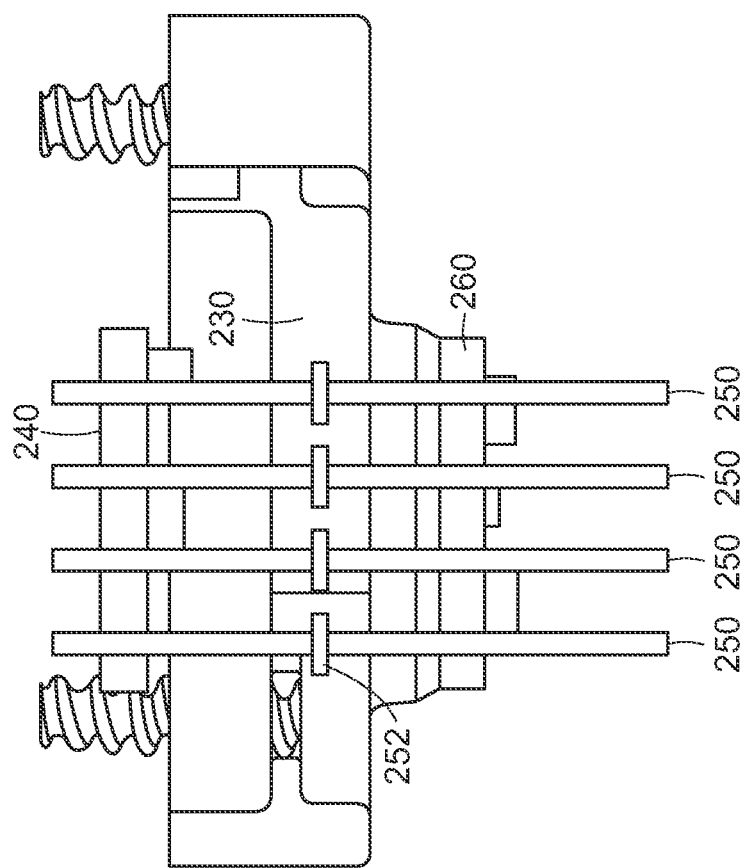
FIG. 18 is another cross-sectional view of a portion of the first suction cup shown in FIG. 14.

As shown in FIGS. 17-18, in one embodiment, the electrical lines 250 include a protruding feature 252 which anchors the electrical line 250 within the integrally molded housing 230 (i.e. prevents the electrical line 250 from being inadvertently pulled out after the housing 230 is molded). In one illustrative embodiment, the protruding feature is an annular shaped extension which extends around the electrical wire 250.

Figure 20:
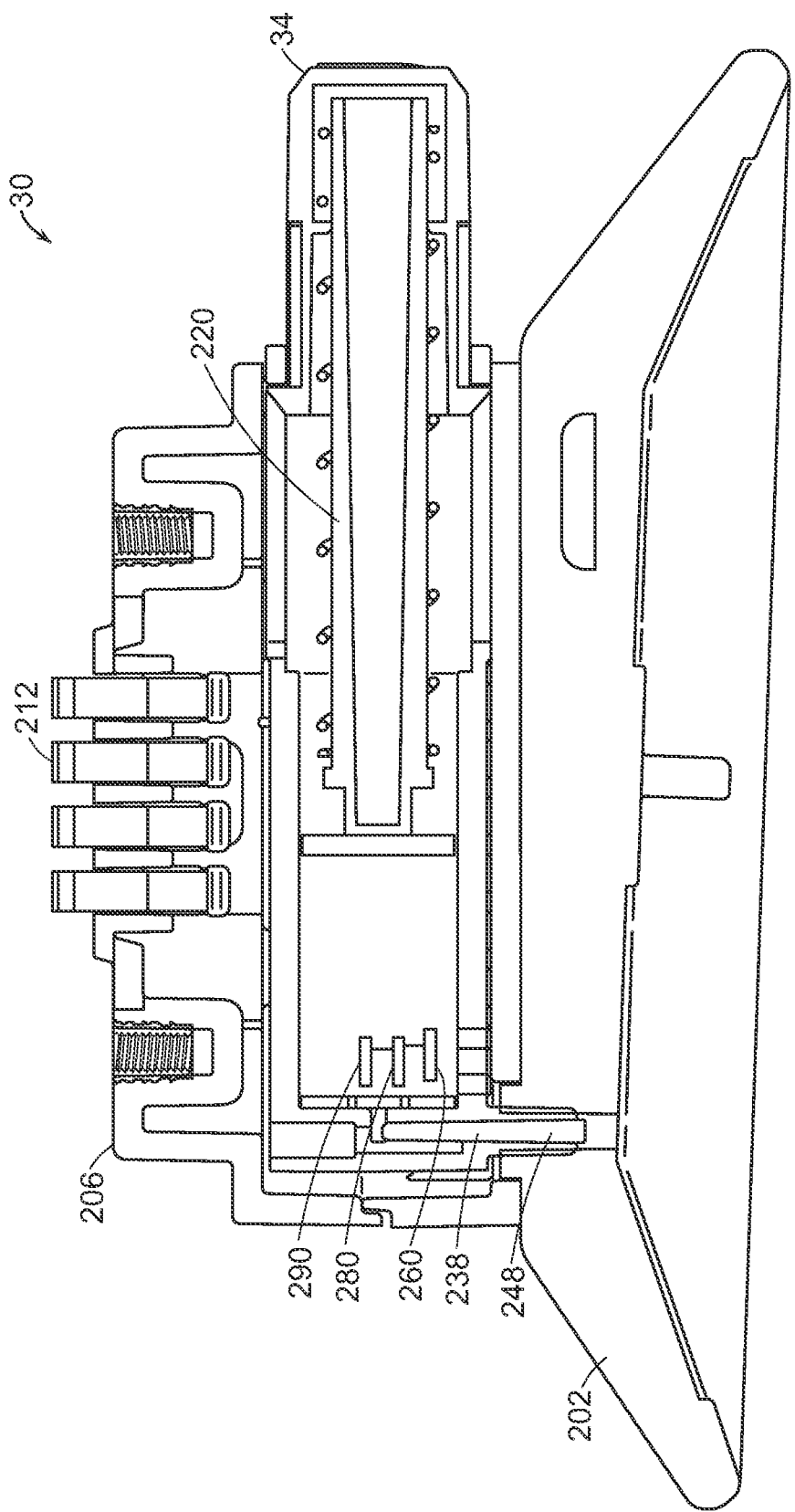
FIG. 20 is a cross-sectional view of another embodiment of a suction cup.

The inventors also recognized that a wireless configuration may also be employed. For example, in one embodiment shown in FIG. 20, an electrical line 250 may not pass through the suction cup housing, and instead, a wireless module 280 may be positioned within the suction cup 30 to transmit pressure information from the pressure sensor 260 to a location outside of the suction cup 30. The wireless module 280 may be coupled to the first pressure sensor 260 to selectively pair the first pressure sensor 260 to a nearby electronic device, such as either the above-described central hub 100 and/or a nearby smart phone 150. As shown in FIG. 20, a power source 290 may also be positioned within the suction cup housing and it may be coupled to the first pressure sensor 260 and/or the wireless module 280 to provide power to these components. In this particular embodiment, the first pressure sensor 260, wireless module 280, and power source 290 are positioned within the suction chamber adjacent the vacuum pump housing 220. In another embodiment, one or more of these components 260 280, 290 may be positioned in other portions of the suction chamber, such as, but not limited to, the cavity 232 of the base cup 204. The inventors recognized that in the above-described wireless configuration, pressure loss within the chamber is prevented because there are not electrical lines 250 passing through the suction housing.

It should also be recognized that the above description directed to the first suction cup 30 having a first pressure sensor 160, 260 may also apply to the other suction cups 32, 40, 42, as the disclosure is not limited in this respect. For example, in one embodiment, the second suction cup 32 has a second pressure sensor 160, 260 positioned within the suction cup housing to detect suction chamber pressure information.

Although several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A carrier device for securing an accessory to a vehicle, the carrier device comprising:
   a support frame having a first end and a second end;
   a first suction cup pivotally mounted on the support frame, wherein the position of the first suction cup relative to the support frame is adjustable to selectively couple the carrier device to a vehicle; the first suction cup comprising:
      a suction cup housing defining a suction chamber therein;
      a vacuum pump configured to selectively adjust the pressure within the suction chamber to couple the first suction cup to a vehicle;
      a first pressure sensor positioned within the suction cup housing to detect suction chamber pressure information;
      at least one electrical line coupled to the first pressure sensor to transmit suction chamber pressure information to a location outside of the first suction cup; and an integrally molded housing formed around the at least one electrical line to prevent pressure loss within the suction chamber.

2. The carrier device of claim 1, wherein the at least one electrical line includes at least one pin which is placed in a mold that is used to form the integrally molded housing.

3. The carrier device of claim 1, wherein the at least one electrical line includes a plurality of electrical lines, that includes one or more pins or wires.

4. The carrier device of claim 1, further comprising a central hub associated with the support frame, wherein the central hub includes:
   a power source configured to be coupled to the first pressure sensor; and
a short range wireless interconnection module to selectively pair the first pressure sensor to a nearby electronic device to transmit the suction chamber pressure information to a user.

5. The carrier device of claim 4, wherein the at least one electrical line is coupled to the central hub.

6. The carrier device of claim 1, further comprising a second suction cup pivotally mounted on the support frame, wherein the position of the second suction cup relative to the support frame is adjustable to selectively couple the carrier device to a vehicle; the second suction cup comprising:
   a suction cup housing defining a suction chamber therein;
   a vacuum pump configured to selectively adjust the pressure within the suction chamber to couple the first suction cup to a vehicle;
   a second pressure sensor positioned within the suction cup housing to detect suction chamber pressure information;
   at least one electrical line coupled to the second pressure sensor to transmit suction chamber pressure information to a location outside of the second suction cup; and
   an integrally molded housing formed around the at least one electrical line to prevent pressure loss within the suction chamber.

7. The carrier device of claim 6, wherein the first suction cup is pivotally mounted at the first end of the support frame, and the second suction cup is pivotally mounted at the second end of the support frame.

8. The carrier device of claim 1, wherein the suction cup housing further comprises:
   a suction cup bottom which is configured to contact a surface of a vehicle; and
   a base cup positioned adjacent the suction cup bottom, wherein the base cup includes a cavity to receive the integrally molded housing and at least one electrical line.

9. The carrier device of claim 8, wherein the base cup includes a notch configured to receive the vacuum pump.

10. The carrier device of claim 5, wherein the at least one electrical line includes an adjustable length wire coupling the first pressure sensor to the central hub; and
   wherein the support frame has a length, and wherein the length of the support frame is adjustable to adapt to the size of a vehicle, and wherein the adjustable length wire is positioned within the support frame such that the length of the wire is adjustable to the length of the support frame.

11. The carrier device of claim 1, wherein the at least one electrical line has a protruding feature which anchors the electrical line within the integrally molded housing.

\* \* \* \* \*